(12) United States Patent
Otten et al.

(10) Patent No.: US 9,333,602 B2
(45) Date of Patent: May 10, 2016

(54) DEVICE AND A METHOD FOR THE INSERTION OF A GROUP OF FASTENERS

(71) Applicant: Airbus Operations GmbH, Hamburg (DE)

(72) Inventors: Juergen Otten, Hamburg (DE); Frank Neuhaus, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 288 days.

(21) Appl. No.: 13/893,606

(22) Filed: May 14, 2013

(65) Prior Publication Data

US 2013/0298371 A1 Nov. 14, 2013

Related U.S. Application Data

(60) Provisional application No. 61/646,389, filed on May 14, 2012.

(30) Foreign Application Priority Data

May 14, 2012 (DE) .......................... 10 2012 208 042

(51) Int. Cl.
*B23P 19/04* (2006.01)
*B23P 19/12* (2006.01)
*B21J 15/10* (2006.01)
*B21J 15/32* (2006.01)

(52) U.S. Cl.
CPC .................. *B23P 19/04* (2013.01); *B21J 15/10* (2013.01); *B21J 15/32* (2013.01); *B23P 19/12* (2013.01); *Y10T 29/49799* (2015.01); *Y10T 29/53478* (2015.01); *Y10T 29/53961* (2015.01)

(58) Field of Classification Search
CPC ....... F16B 27/00; F16B 15/08; B25B 23/045; B21J 15/323; Y10T 29/53478; B23P 19/12
See application file for complete search history.

(56) References Cited

U.S. PATENT DOCUMENTS

| 4,018,334 | A | * | 4/1977 | Lejdegard | 206/346 |
| 4,212,094 | A | * | 7/1980 | Pray | 24/31 B |
| 4,258,461 | A | * | 3/1981 | Pray | 29/243.5 |
| 4,380,109 | A | * | 4/1983 | Pray | 29/466 |
| 5,244,088 | A | | 9/1993 | Musil | |
| 5,509,768 | A | * | 4/1996 | Hon | 411/442 |
| 5,775,514 | A | * | 7/1998 | Lin | 206/347 |
| 2003/0127346 | A1 | * | 7/2003 | Chen et al. | 206/346 |
| 2005/0230278 | A1 | * | 10/2005 | Vogrig et al. | 206/338 |
| 2006/0006087 | A1 | * | 1/2006 | Lin | 206/347 |
| 2006/0006088 | A1 | * | 1/2006 | Lin | 206/347 |

FOREIGN PATENT DOCUMENTS

| DE | 820362 | 7/1949 | |
| DE | 1752450 | 5/1971 | |
| WO | WO 2010066256 A1 * | 6/2010 | B05C 13/02 |

OTHER PUBLICATIONS

German Search Report, May 14, 2012.

* cited by examiner

*Primary Examiner* — Jermie Cozart
(74) *Attorney, Agent, or Firm* — Greer, Burns & Crain Ltd.

(57) ABSTRACT

A mobile device and a method for the placement of a group of pin-type fasteners so as to form at least one seam field for purposes of connecting large components in aircraft construction, such as fuselage shells and fuselage sections, for purposes of connecting large components in ship construction, in rail vehicle construction, in building construction, and similar construction environments.

9 Claims, 3 Drawing Sheets

DEVICE AND A METHOD FOR THE INSERTION OF A GROUP OF FASTENERS

CROSS-REFERENCES TO RELATED APPLICATIONS

This application claims the benefit of the U.S. Provisional Application No. 61/646,389, filed on May 14, 2012, and of the German patent application No. 10 2012 208 042.2 filed on May 14, 2012, the entire disclosures of which are incorporated herein by way of reference.

BACKGROUND OF THE INVENTION

The invention concerns a device for the simultaneous insertion of a multiplicity of pin-type fasteners, each in one seating, so as to form at least one seam field and a method.

Aircraft fuselages of passenger aircraft and freight aircraft consist of individual fuselage sections, which in each case are connected with one another by means of a so-called transverse seam running in the peripheral direction. In turn the fuselage sections can consist of individual longitudinal shells, for example two side shells, a lower shell and an upper shell, which in each case are connected with one another by means of a longitudinal seam running in the longitudinal direction. If, however, the fuselage sections are wound from one strip of material in the peripheral direction, the longitudinal seams are omitted. Traditionally the adjacent shell elements and/or fuselage sections in the seam fields are positioned relative to one another in an overlap joint, and are then connected with one another by means of a multiplicity of rivets. If the shell elements and/or fuselage sections are positioned relative to one another in a butt joint, a strap is positioned on the cabin side extending over the butt joint field; the strap is then riveted together with the shell elements and/or fuselage sections in an overlap joint. The riveting procedure is undertaken manually and is individual to each rivet.

As, for example, shown in the German patent document DE 820 362 B, it is of known art in the assembly of small parts to combine individual rivets into a group and to introduce the group into locating holes. For this purpose the rivets are positioned head down in retainers designed as depressions on a stationary support table, and the small part to be assembled is then lowered onto the rivets. Finally pressure is simultaneously applied to the rivets.

SUMMARY OF THE INVENTION

The object of the invention is to create a device and a method for the insertion of fasteners, which enables a reduction of assembly times in the assembly of large parts, in particular in aircraft construction.

An inventive device for the simultaneous insertion of a multiplicity of pin-type fasteners, in particular rivets, each in one seating, so as to form at least one seam field, is mobile, and has a carrier plate, which has a mounting surface for the arrangement of the heads of the fasteners, and also at least one means of retention for the fixing of the fasteners on the mounting surface such that they can be released.

The inventive device enables the simultaneous introduction of the fasteners in the group, so that in comparison to conventional assembly the components can be assembled more quickly. The fact that the device is mobile means that the device can be freely aligned by the assembly personnel on the components forming the seating. The device can thus be moved over the whole seam field so that the seam can be fully formed. The device, i.e., the carrier plate, therefore only needs to accommodate a proportion of all the fasteners required as a group. The device can be populated with the fasteners in advance by the fastener manufacturer so that assembly times are further reduced. Population can take place automatically, so that any use of incorrect fasteners is ruled out, and resource-intensive correction measures, such as the boring out or knocking out of incorrect fasteners, are omitted. Moreover the loss of fasteners can be reduced compared with individual handling, since a check can always be made visually by the assembly personnel as to whether the carrier plate is populated with the prescribed number of fasteners. Moreover damage to the fasteners is reduced since the latter are no longer stored as loose stock. In addition the device allows an automated application of the sealant onto the mounting surface, i.e., the fasteners, and by this means accurate metering, so that by virtue of the quantity of sealant expressed from the seatings a check can be made visually concerning the quality of the fastener connection.

In one example of embodiment the mounting surface has no contours. By this means the fasteners can be portably arranged on the mounting surface, such that a multiplicity of seating fields, i.e., fastener fields, can be formed on the mounting surface.

In an alternative example of embodiment the mounting surface has defined mounting regions for the arrangement of the fasteners. By this means the carrier plate is limited to individual fastener fields.

The at least one retaining element is preferably a bonding agent. The latter can be, for example, a double-sided adhesive tape, double-sided adhesive tabs, or a fluid adhesive. The adhesive tape can be applied extensively onto the whole of the mounting surface. The adhesive tabs can electively be provided on the mounting surface or on the fasteners. However, the arrangement of the adhesive tabs on the mounting surface requires accurate knowledge concerning the seating field, so that the tabs can be positioned in the desired positions for the fasteners. In order to prevent the adhesive surface from drying out it is advantageous to remove a protective foil from the adhesive surface just before the mounting procedure. The adhesive can also be applied onto the heads of the fasteners, or in desired positions on the mounting surface. Compared with adhesive tape and adhesive tabs, adhesive has the advantage that it can be quickly applied and no protective films must be removed. Moreover the necessary quantity of fluid bonding agent can be metered very well.

Alternatively the at least one means of retention can be a mechanical form fit element, which in each case is arranged in a mounting region. Examples of form fit elements are spring clamps, which engage around the periphery of the fasteners in the head region. Compared with bonding agents, form fit elements have the advantage that they are reusable, and any cleaning of the carrier plate after insertion of the fasteners has taken place is omitted.

The carrier plate can preferably be elastically deformed. By this means the carrier plate can be deployed both on planar seam surfaces and also on curved seam surfaces. Thus such a carrier plate can, for example, be deployed in aircraft construction both on longitudinal seams and also on transverse seams. Moreover any unevenness of the components can be compensated for. The carrier plate preferably is comprised of a plastic. Such a carrier plate is quick to manufacture, has a low weight and with an appropriate choice of plastic is very robust chemically, thermally and mechanically. However, the carrier plate can also be formed from an elastically deformable metal, or from a wood-based material, including paper and cardboard. In particular the carrier plate can be embodied as a disposable product, and after a one-time use can be fed to a waste recycling system.

In order to be able to check visually the introduction of the fasteners into the seatings, the carrier plate can be transparent.

During the stripping of lockbolts shearing noise levels of from approx. 114 dB (A) (aluminium) up to 140 dB (A) (fibre composite materials with carbon fibres) can be generated. Since such shearing noise levels are generated for each locking ring bolt, i.e., lockbolt, they can be hazardous to the health of the assembly personnel. For purposes of noise reduction the device can therefore have a damping element, which can be arranged between the carrier plate and the seatings, i.e., the seam surfaces. The damping element is fastened, for example adhesively bonded, to either the carrier plate or the seam surface. If the damping element is adhesively bonded onto the seam surface, however, care must be taken that the damping element can be removed in a manner that is protective to the material.

In an inventive method for the placement with an inventive device of pin-type fasteners, in particular rivets, in each case in a seating so as to form at least one seam field, the carrier plate of the device is firstly populated with the fasteners in accordance with an arrangement of the seatings relative to one another. The carrier plate, populated with the fasteners, is then positioned opposite to the seatings. The fasteners are subsequently inserted into the seatings by means of a movement of the carrier plate in the direction of the seatings. After that the carrier plate is removed by a reverse movement from the seatings, whereby the fasteners are locked either before removal or after removal.

Such a method enables rapid placement of the fasteners and thus rapid seam formation for large components, such as in aircraft construction, ship construction, rail vehicle construction, and similar. In particular the population of the carrier plate can be automated, as a result of which the assembly time is further reduced and errors in the form of incorrect use of fasteners, for example, are ruled out. By means of the inventive method additional costs caused by material loss or additional technical expenditures, such as, for example, additional cleaning tasks, are omitted.

The placement of the fasteners can be further accelerated, if a sealant is applied onto the fasteners before the population of the carrier plate. By this means manual application of sealant immediately before insertion into the seatings is omitted. The application of sealant can be automated, as a result of which the quantity of sealant applied in each case can be exactly adjusted in a repeatable manner. The quantity of sealant can be adjusted such that during locking of the fasteners and with a correct seating design a constant quantity of sealant is always expressed out of the seating onto the head of the fastener. If after locking of the fasteners the expected pattern of squeezed-out sealant is not achieved, this can be evidence of a defective seating design.

For purposes of holding the carrier plate while the fasteners are being locked foot supports of a counterholder can be positioned on the rear face of the carrier plate. For purposes of noise reduction the foot supports can optionally be positioned in the vicinity of resonance points of the carrier plate. Moreover a damping element can be arranged extensively between the carrier plate and the outer skin, so that sound waves can dissipate in the damping element.

Other advantageous examples of embodiment of the invention are the subject of further subsidiary claims.

BRIEF DESCRIPTION OF THE DRAWINGS

In what follows preferred examples of embodiment of the invention are elucidated in more detail with the aid of schematic representations. Here.

DETAILED DESCRIPTION OF THE PREFERRED EMBODIMENTS

Figure 1:
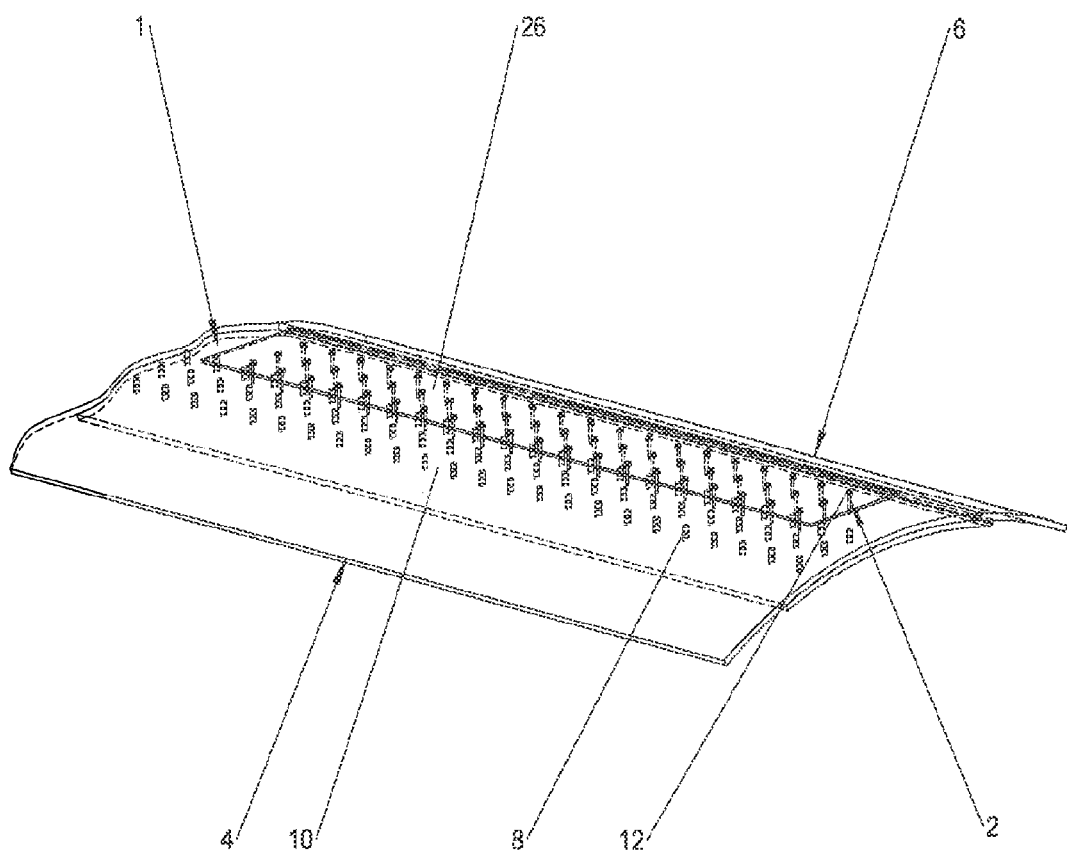
FIG. 1 shows an inventive step in the method for the formation of a rivet seam using an inventive device.

FIG. 1 shows an inventive device 1 for the insertion of each of a multiplicity of fasteners 2 into a seating formed from two components, i.e., large parts 4, 6, so as to form a seam connecting the components 4, 6 with one another. The device 1 is mobile and enables the placement of the fasteners 2 as a group. In particular it is hand-operated, but can also be moved by a robot arm in an automated manner. Depending upon the seam size and the device size all the fasteners 2 required to form the seam can be placed simultaneously, or each of the fasteners 2 of an individual seam field can be placed simultaneously.

The fasteners 2 are in the form of pins, and are, for example, rivets, in particular locking ring bolts such as lockbolts or Hi-Locks.

The components 4, 6 are, for example, fuselage shells of an aircraft, which are to be connected with one another in the longitudinal direction so as to form a longitudinal riveted seam. However, the device 1 can also be deployed, for example, so as to form transverse seams, so as to join together so-called "crack stoppers" or in transverse beam-frame connectors. In the example of embodiment shown in FIG. 1 the components 4, 6 are arranged relative to one another with their longitudinal side regions in an overlap joint. Alternatively the components 4, 6 are arranged relative to one another in a butt joint, whereby a strap is then provided on the cabin side, which strap extends over the butt joint field and is riveted together with the components 4, 6.

The seatings 8 are bores, i.e., holes, extending through the components 4, 6, which are arranged relative to one another in a particular pattern. For purposes of guiding the fasteners on introduction into the seatings 8 the latter have a funnel-shaped depression in their introductory region. The depression is preferably designed such that the fasteners 2 with their heads 12 can be completely immersed in the depressions, and by this means a plane, or almost plane, outer surface 10 is created in the seam field.

Figure 2:
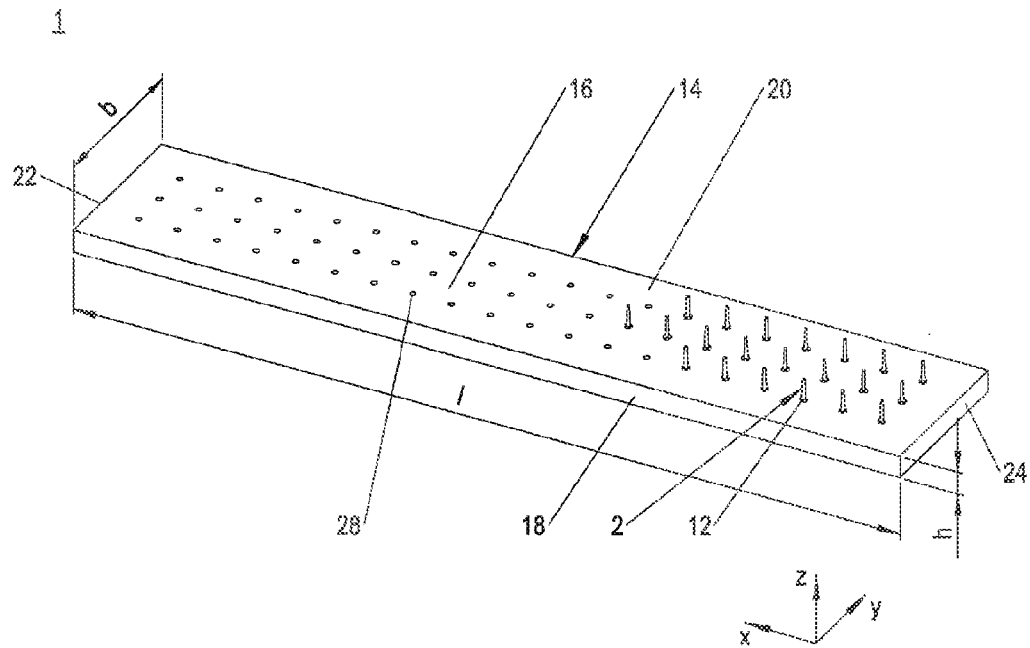
FIG. 2 shows an individual presentation of the device in FIG. 1 in the partially populated state.
Figure 3:
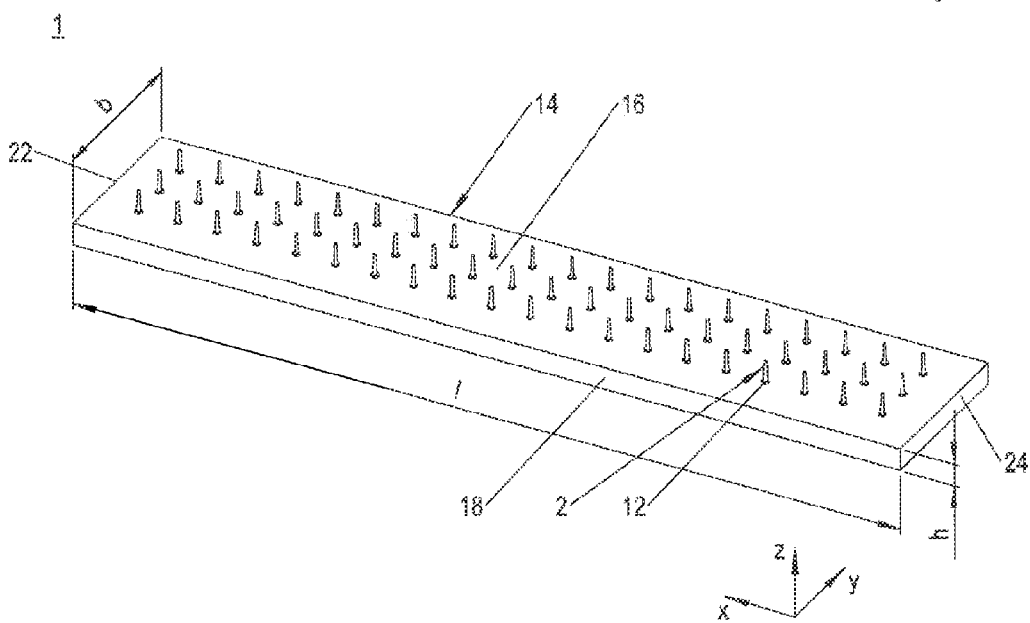
FIG. 3 shows an individual presentation of the device in FIG. 1 in the fully populated state.

As shown in FIGS. 2 and 3, the mobile device 1 has a carrier plate 14 with a mounting surface 16 for the arrangement of the fasteners 2. Moreover the device 1 includes at least one retaining element 28 for fixing the fasteners on the mounting surface 16, i.e., the carrier plate 14, such that they can be released.

In the example of embodiment shown the carrier plate 14 is a flat cuboid with a constant extent along its vertical axis z, i.e., a constant height h. The carrier plate 14 can be elastically deformed about its longitudinal axis x, transverse axis y and vertical axis z, and can thus, for example, be conformably laid onto curved outer surfaces 10. In principle the carrier plate 14 can be elastically warped by the assembly personnel per se, and in this manner can compensate for unevennesses on the outer surface 10. The carrier plate 14 can, for example, be comprised of a plastic material. The plastic material can moreover be transparent, so that the alignment of the fasteners 2 can be checked during insertion from the rear face by the assembly personnel.

For purposes of manual gripping of the carrier plate 14 the latter has a height h such that its peripheral narrow faces 18, 20, 22, 24 can serve as lateral gripping sections. Alternatively handles can, for example, be provided on a rear face 26 (see FIG. 1) facing away from the mounting surface 16, and thus on the rear face to the mounting surface 16.

The mounting surface 16 is a flat, i.e., contour-less, large surface of the carrier plate 14, and in this example of embodiment extends over the whole length 1 and width b of the carrier plate 14. It serves to provide the arrangement of the heads of the fasteners 2. In the example of embodiment shown here the fasteners 2 can be freely arranged, i.e., in any required pattern, on the mounting surface 16. Seatings 8, in which, for example, a stapler is deployed for purposes of stapling the components 4, 6, are excluded. In an alternative example of embodiment, not shown, the mounting surface 16 has predefined mounting fields for the arrangement of the fasteners 2.

The at least one means of retention 28 is preferably a fluid bonding agent (fluid adhesive). The bonding agent 28 can be metered very accurately and can be sprayed on, either in the desired positions of the fasteners 2 on the mounting surface 16 (see FIG. 2), or onto the end faces of the heads 12 of the fasteners 2. The bonding agent 28 is metered such that no bonding agent residues are present on the heads 12 of the fasteners after removal of the carrier plate 14.

In what follows a preferred method for the placement of the fasteners 2 in a seam field is explained in more detail.

As shown in FIGS. 2 and 3, the carrier plate 14 is firstly populated with the fasteners 2 in accordance with an arrangement of the seatings 8 relative to one another, i.e., corresponding to a seating field. Seatings 8, in which, for example, a stapler is deployed for purposes of stapling the components 4, 6, are excluded. In this regard a fluid bonding agent 28 is sprayed on the mounting surface 16 in the desired positions of the fasteners 2. Then the end faces of the heads 12 of the fasteners 2 are arranged on the mounting surface 16 in the desired positions. With a horizontal alignment of the carrier plate 14, with a mounting surface 16 pointing upwards, the fasteners 2 are thus fixed head down on the carrier plate 14. The fasteners 2 are now connected to the mounting surface 16 such that they can be released, and form a group. In order to avoid bonding agent residues on the fasteners 2 after the carrier plate 14 has been released after insertion and/or locking, the bonding agent 28 is metered such that its adhesive action on the mounting surface 16 is greater than that on the heads 12 of the fasteners. Before the fasteners 2 are positioned in their desired positions, a sealant (not shown) is preferably sprayed onto a region of the shaft near the head. Since the sealant can be metered very accurately and repeatably, this ensures that, even in the case of clearance fits between the seatings 8 and the fasteners 2, sufficient sealant is always arranged on the fasteners 2.

As shown in FIG. 1, the carrier plate 14, populated with the fasteners 2, is positioned opposite the seatings 8 such that the fasteners 2 are oriented in alignment with the seatings 8.

The fasteners 2 are then inserted as a group into the seatings 8. In this regard the carrier plate 14 is moved in the direction of the components 4, 6 until the fasteners 2 are fully accommodated in the seatings 8 and their heads 12 are fully accommodated in the depressions that are acting as insertion aids.

After the fasteners 2 have been inserted they are locked in the seatings 8 and by this means the seam field is manufactured. If the fasteners 2 are, for example, locking ring bolts, then locking rings are placed on locking sections projecting internally from the seatings 8 and are individually locked with, or pressed onto, the latter. When a desired pressure force has been achieved, a free end section of the locking ring bolt is preferably torn off by the riveting tool that is pressing onto the locking ring, and by this means locking is completed.

If the fasteners 2 in the unlocked state are accommodated in the seatings 8 with radial clearance (clearance fit) the carrier plate 14 is preferably pressed against the outer surface 10 in the course of the locking procedure. This ensures that the fasteners 2 are located in their desired axial location in the course of the locking procedure, and thus that their heads 12 are accommodated in the depressions. If the carrier plate 14 is pressed against the outer surface 10 by means of a counterholder (not shown), assembly personnel are not required to hold the fasteners, during, for example, placement of the locking rings.

Since very loud shearing noises can be generated as the fasteners 2 are being locked, it is preferable if the carrier plate 14 is always pressed against the outer surface 10 by means of a counterholder. For purposes of noise reduction the foot supports of the latter preferably engage with the rear face of the carrier plate 14 at its resonance points. If the fasteners 2 are locking ring bolts with an end section that is to be sheared off, and if the components 4, 6 are comprised, for example, of an aluminium alloy, then as the end sections are being sheared off noises levels of up to approx. 110 dB (A) can be generated. If the components 4, 6 are comprised of a fibre composite material such as CFRP, shearing noise levels of up to 140 dB (A) can be generated. Alternatively, or additionally, a damping element can be arranged between the carrier plate 14 and the outer surface 10.

After the fasteners 2 have been locked the carrier plate 14 is released by a reverse movement from the locked fasteners 2. Any bonding agent residues are removed from the carrier plate 14 and the latter is available for further population with fasteners.

If the fasteners 2 in their unlocked state are accommodated in the seatings 8 without any radial clearance (press fit) the carrier plate 14 can be removed in advance before the fasteners 2 are locked. If the fasteners 2 are driven into the seatings 8 by means of a hammer, or similar, the carrier plate also serves, in particular in the case of a press fit, as impact protection, such that the heads 12 of the fasteners are not damaged by the impacts.

Figure 4:
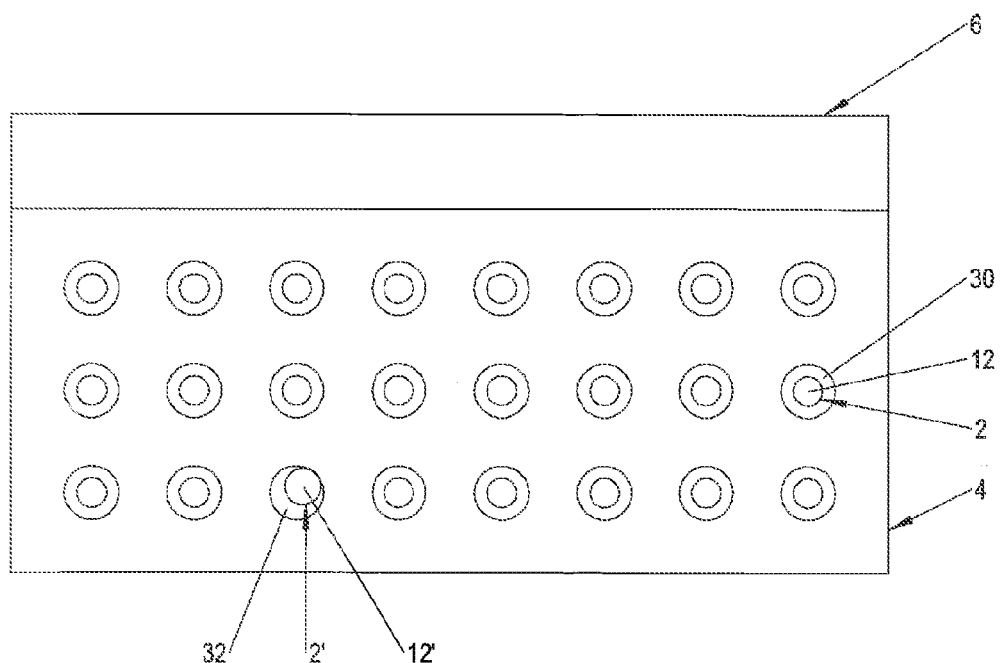
FIG. 4 shows a plan view onto a formed seam field.

When the locking procedure is complete the assembly personnel execute a visual check of the seam field. As shown in FIG. 4, with a correct locking procedure, a correct choice of fasteners, a correct quantity of sealant, and a correct depression, a closed sealant ring 30 is located around the heads 12 of the fasteners 2. However, if, for example, the depression is defective, then only a reduced quantity of sealant is squeezed out of the depression and just a sickle-shaped sealant bead 32 is formed around the head of the fastener 12'. In such a case the assembly personnel can inform quality assurance, who then determine whether the fasteners 2' must be replaced. A check of the seam field is optionally undertaken in an automated manner by means of an optical recording unit such as a camera.

The inventive device 1 allows, in addition to insertion of fasteners 2 in a group, automated prefabrication. Thus the device 1, together with a multiplicity of similar devices 1, can be populated in advance by the manufacturer with respective groups of fasteners. Delivery to the respective build station so as to form the seam can be undertaken using a just-in-time procedure. Application of the bonding agent 28 and sealant, as well as the positioning of the fasteners 2 on the carrier plate 14, can take place in a fully automated manner. Cleaning of bonding agent residues from the mounting surface 16 can likewise be fully automated. The device 1 can optionally be fitted with RFID technology and can also serve to provide registration of process data. In a preferred process sequence the fasteners 2 are provided with the sealant in a fully automated manner, and the carrier plate 14 is populated in a fully automated manner. That is to say, the bonding agent 28 is sprayed onto the desired positions on the mounting surface 16 in a fully automated manner, and the fasteners 2, provided with sealant, are positioned in the desired positions in a fully automated manner, the populated carrier plate 14 is then delivered using a just-in-time procedure. After a manually executed insertion and locking of the fasteners 2 the carrier plate 14 is transported back to the manufacturer of the fasteners 2, and there is prepared, in particular cleaned, for population with a new group of fasteners. However, if the carrier plate 14 is designed as a disposable product, after the insertion and locking procedures it is fed to a waste recycling system. Any reuse and, in particular, cleaning of the carrier plate 14 is thus omitted. A disposable carrier plate is comprised, for example, of cardboard.

Disclosed is a mobile device and a method for the placement of a group of pin-type fasteners so as to form at least one seam field for purposes of connecting large components in aircraft construction, such as fuselage shells and fuselage sections, for purposes of connecting large components in ship construction, in rail vehicle construction, in building construction, and similar.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A device for the simultaneous insertion of each of a multiplicity of pin-type fasteners into a seating so as to form at least one seam field, wherein the device is mobile and has a carrier plate, the carrier plate having a mounting surface for arrangement of heads of the fasteners, and at least one fluid adhesive for releasably fixing the fasteners on the mounting surface, wherein end faces of the heads of the fasteners are arranged and releasably fixed, by the fluid adhesive, heads down on the mounting surface in desired positions.

2. The device in accordance with claim 1, wherein the mounting surface has no contours.

3. The device in accordance with claim 1, wherein the mounting surface has defined mounting regions.

4. The device in accordance with claim 1, wherein the carrier plate is elastically deformable.

5. The device in accordance with claim 1, wherein the carrier plate is transparent.

6. The device in accordance with claim 1, further including a damping element for purposes of noise reduction, arranged between the carrier plate and the seating.

7. The device according to claim 1, wherein the pin-type fasteners comprise rivets.

8. A method for the insertion of pin-type fasteners, each in one seating, so as to form at least one seam field, with a mobile device for the simultaneous insertion of each of a multiplicity of pin-type fasteners into a seating so as to form at least one seam field, wherein the device has a carrier plate, the carrier plate having a mounting surface for arrangement of heads of the fasteners, and at least one fluid bonding agent for releasably fixing the fasteners on the mounting surface, wherein end faces of the heads of the fasteners are arranged on the mounting surface in desired positions, comprising the steps:

spraying the fluid bonding agent in the desired positions of the fasteners on a mounting surface of a carrier plate of the device, populating the mounting surface of the carrier plate of the device with the fasteners in accordance with an arrangement of the seatings relative to one another, such that the end faces of the heads of the fasteners are arranged on the mounting surface in the desired positions, positioning the carrier plate, populated with the fasteners, opposite to the seatings, inserting the fasteners into the seatings via a movement of the carrier plate in the direction of the seatings, removing the carrier plate by a reverse movement, wherein the fasteners are locked in the seatings one of before and after removal of the carrier plate.

9. The method in accordance with claim 8, wherein prior to populating the carrier plate there is a step of applying a sealant onto the fasteners.

\* \* \* \* \*